July 13, 1948.    R. GREAVES    2,445,219
VEHICLE SUSPENSION
Filed May 24, 1945    5 Sheets-Sheet 1

Inventor
R. Greaves
by Mawhinney & Mawhinney
Attorneys

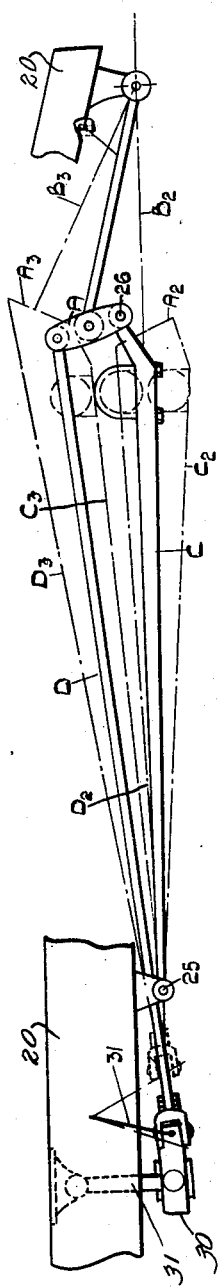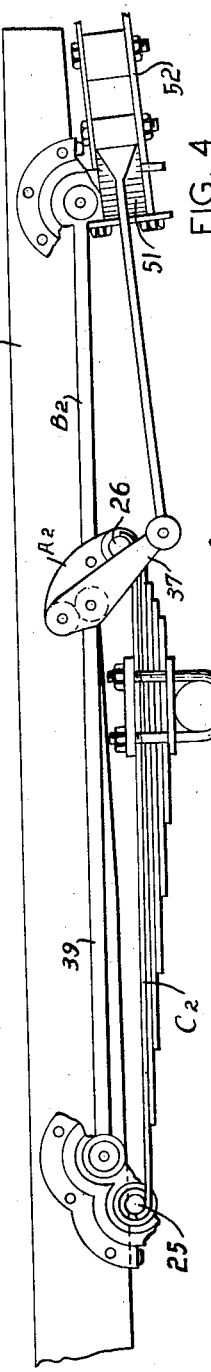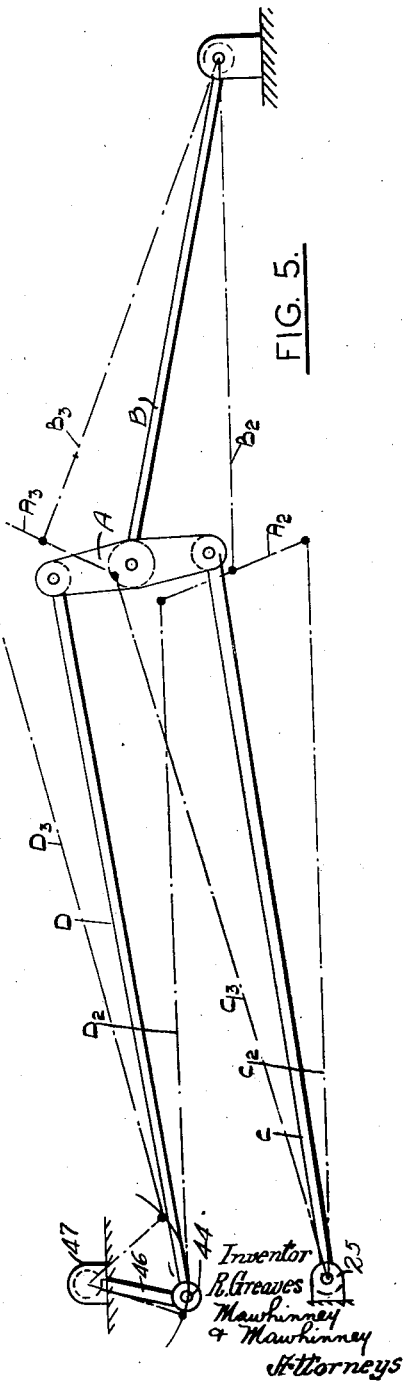

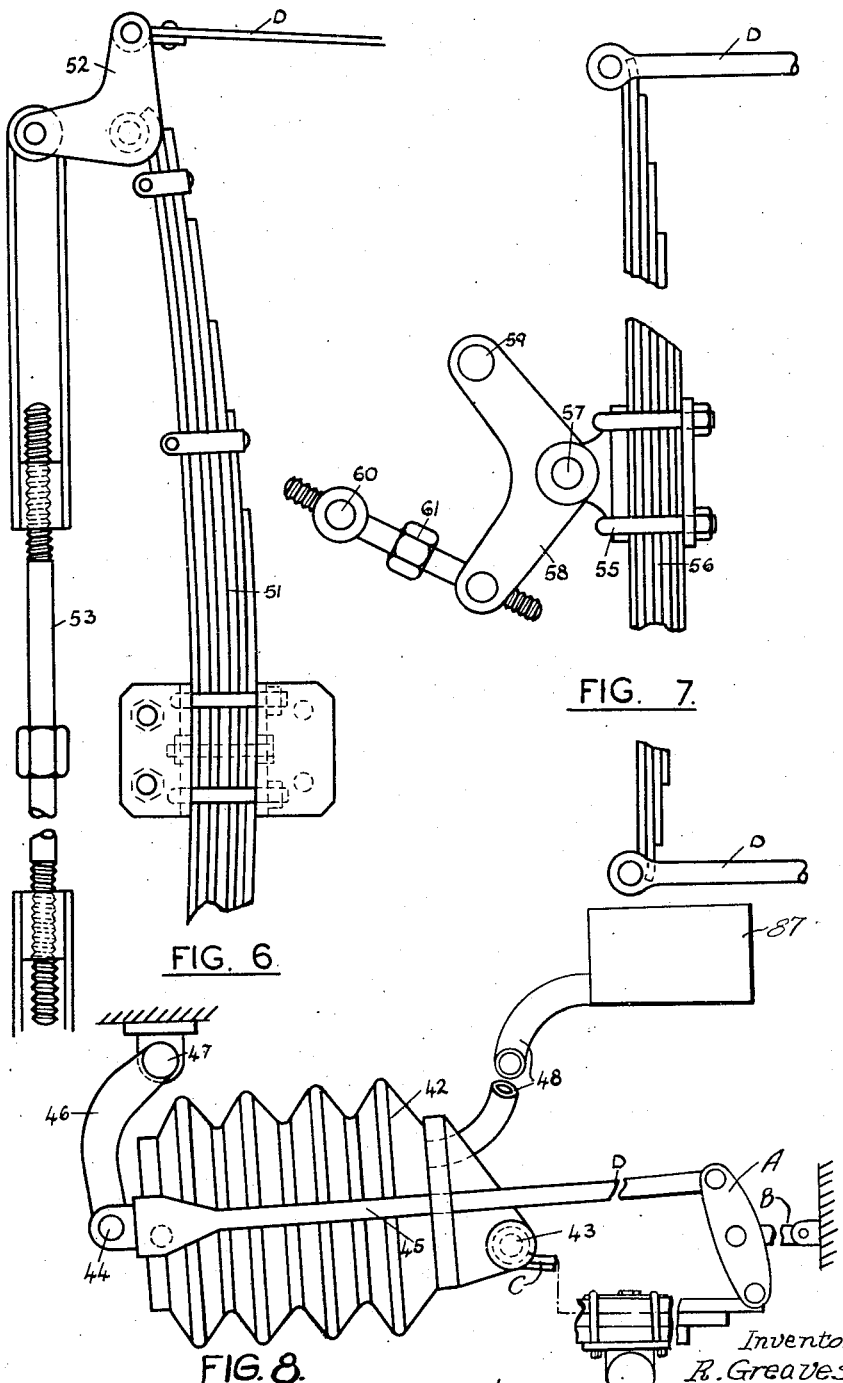

July 13, 1948.  R. GREAVES  2,445,219
VEHICLE SUSPENSION

Filed May 24, 1945　　　　　　　　　　　　5 Sheets-Sheet 4

Inventor
R. Greaves
by Mawhinney & Mawhinney
Attorneys

July 13, 1948.  R. GREAVES  2,445,219
VEHICLE SUSPENSION
Filed May 24, 1945  5 Sheets-Sheet 5
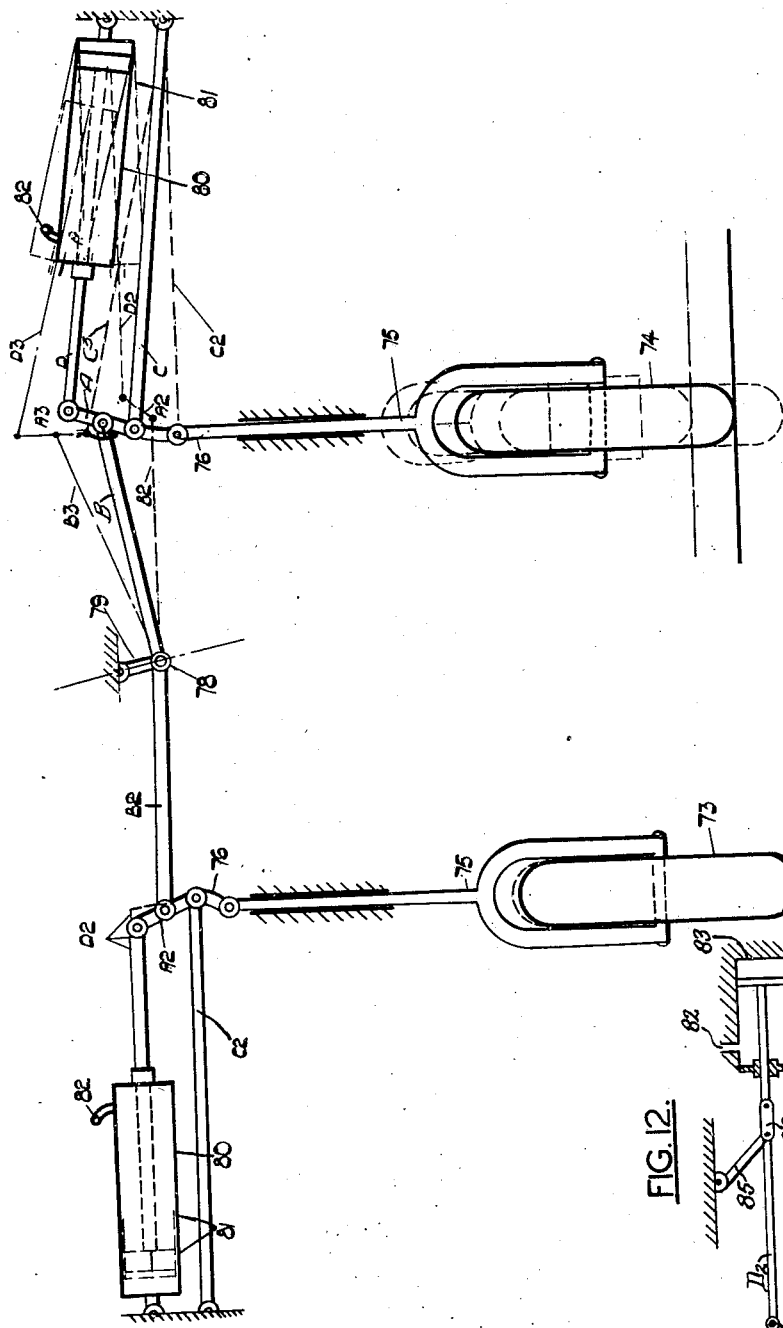

Patented July 13, 1948

2,445,219

UNITED STATES PATENT OFFICE 2,445,219

VEHICLE SUSPENSION

Raymond Greaves, Scarborough, England

Application May 24, 1945, Serial No. 595,632
In Great Britain May 25, 1944

5 Claims. (Cl. 280—104)

This invention relates to suspension means between a supporting wheel and the chassis-frame (and this term is used herein to include those cases in which the body constitutes or provides the chassis-frame) of a motor-car, aeroplane or other vehicle.

My main objects are to provide a safe and comfortable suspension which will be substantially free from roll, pitch and wheel bounce in different load, speed and surface conditions, without recourse to roll stabilizers, manual controls or helper springs. Moreover, with my suspension the usual shock absorbers or dampers may be discarded, or the adjustments modified, as in extreme service conditions a small amount of damping will be all that will be required.

The suspension means of the invention includes a rigid member (which, for convenience, is herein referred to as a shackle) connected at spaced points, as by hinging, to links or arms which extend in opposite directions from the shackle and are connected, as by hinging, to the chassis-frame; means interconnecting the shackle (or one of the arms) and the wheel hub assembly; and prestressed, resilient means connected between the shackle and the chassis-frame and arranged so as to become progressively further stressed, to an increasing extent, as the chassis-frame falls further relatively to the wheel, the resilient means being stressed to a minimum when the wheel is suspended freely (e. g., when the chassis-frame is jacked to lift the wheel), in which conditions the arms and the line of pull of the resilient means are substantially parallel to one another.

In the accompanying diagrammatic drawings—

Figure 3 is a diagrammatic view of the suspension for the back axle, corresponding to Figure 1, in three different positions hereinafter referred to;

Figure 4 is a diagram showing an alternative or modified form of suspension, according to the invention, for the back axle of a motor-vehicle;

Figure 5 is a diagram, similar to that of Figure 3, of an alternative form of the suspension arrangement shown in Figures 1 and 2;

Figure 6 is an enlarged fragmentary plan showing an alternative arrangement (to that of Figures 1 and 2) for interconnecting the suspensions of a pair of wheels, for example, the rear wheels of a motor-vehicle;

Figure 7 is a fragmentary plan showing another alternative method of interconnecting the suspensions of the front or of the rear wheels;

Figure 1:
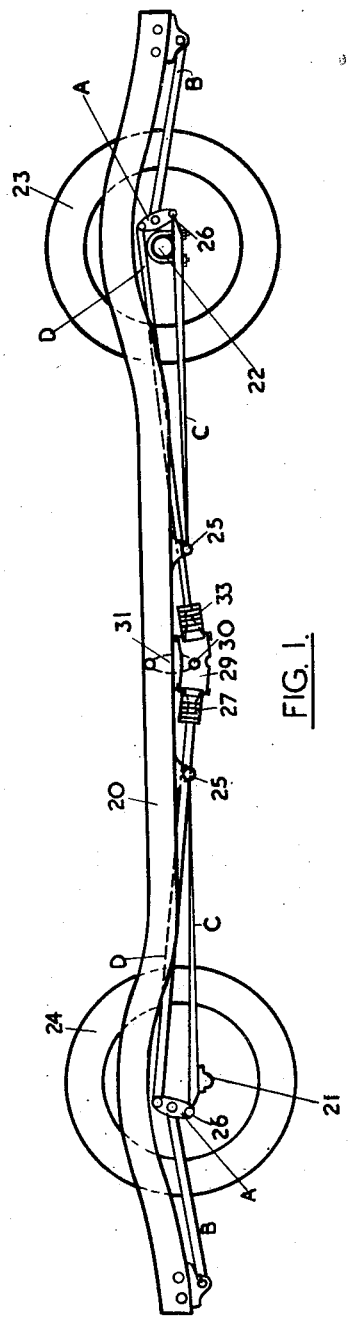
Figure 1 is a fragmentary side elevation of the chassis-frame of a motor-vehicle suspended according to the invention, the aforesaid shackles and some of the links or arms being shown as lines for the sake of simplicity.
Figure 2:
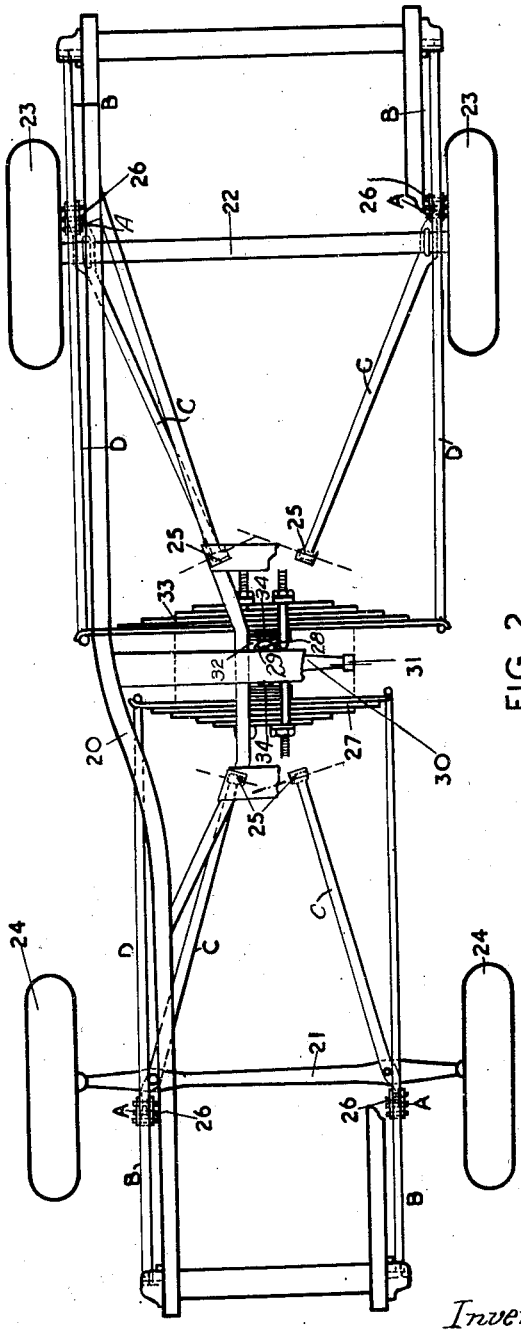
Figure 2 is a fragmentary plan view thereof.
Figures 9, 10:
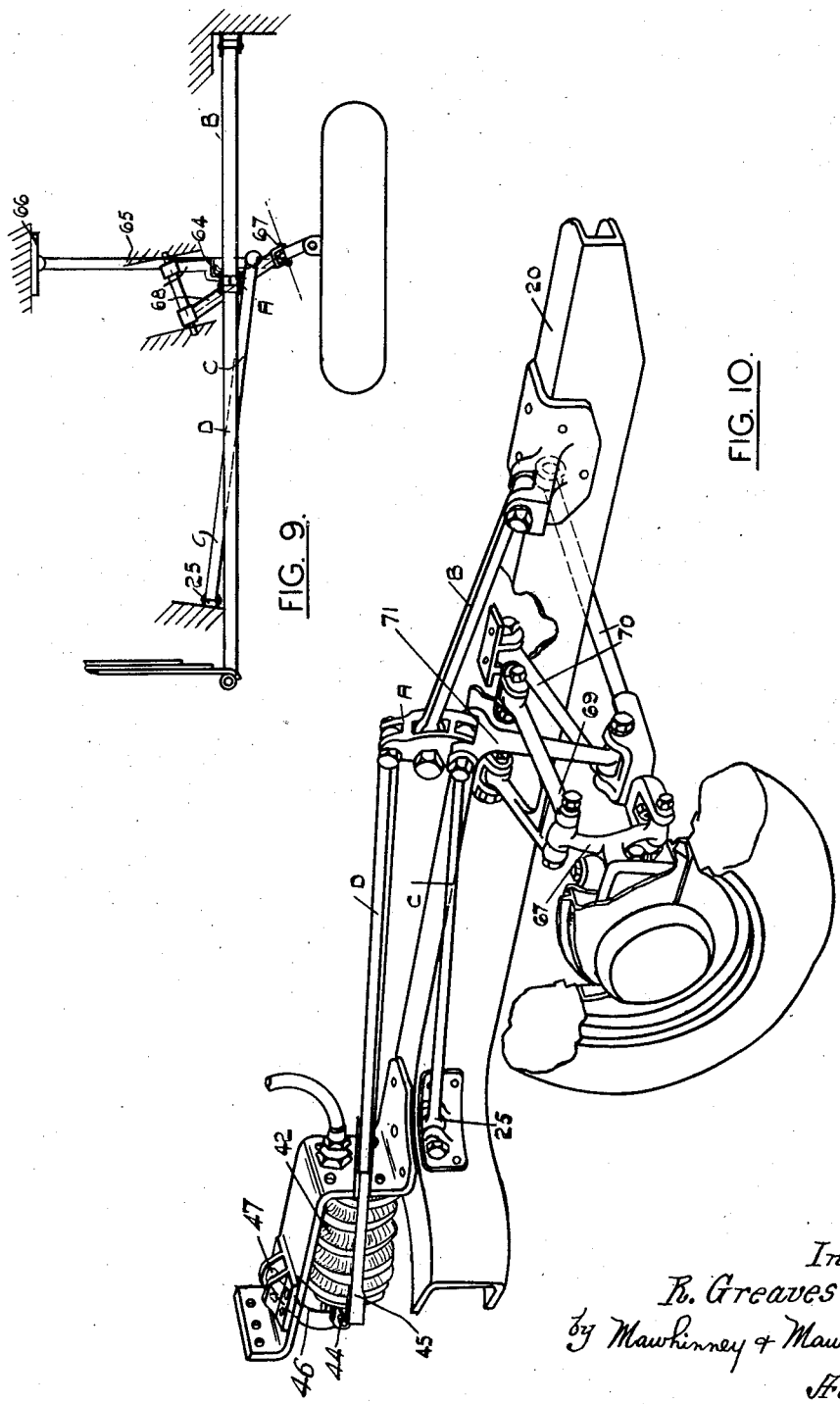

Figure 8 indicates how a pneumatic bellows device may be used to tension the tension link, instead of a laminated form of spring as illustrated in Figures 1 and 2 or instead of a compression or tension spring;

Figure 9 is a diagrammatic plan of an independent suspension arrangement according to the invention.

Figure 10 is a perspective view of another independent suspension;

Figure 11 indicates diagrammatically how a suspension according to the invention may be applied to the landing wheels of an aircraft; and Figure 12 illustrates diagrammatically a modification of the arrangement shown in Figure 10.

As far as possible similar reference characters are applied throughout the various figures to denote the main corresponding parts. Thus, for each wheel suspension, A represents the aforesaid shackle, B and C links or arms connected thereto at spaced points and extending therefrom on opposite sides, and connected also to the chassis-frame, and D the tension link, or a link, through which the prestressed resilient means acts, interconnecting another point of the shackle and the chassis-frame.

The letters A, B, C and D are applied to the parts when the suspension is normally loaded. The suffix 2 is added (see Figure 3 or Figure 5 or Figure 10) to denote the parts when the suspension is substantially relieved of load—i. e., if the chassis-frame be jacked up. And the suffix 3 is added to denote the parts in the fully loaded position.

Referring now to Figures 1, 2 and 3, which, as stated, are very diagrammatical, the chassis-frame is indicated at 20, the front axle at 21, and the back axle at 22. The suspensions for the rear wheels 23, 23 are the same, and the suspensions for the front wheels 24, 24 are also the same and also substantially the same as those for the rear wheels.

The arm C, by which the adjacent axle 21 or 22 is connected to the chassis-frame at 25 and to the shackle at 26 (Figures 1 and 3), is suitably proportioned to withstand the drive and brake torques. It is permanently under tension by means of the prestressed resilient means applied along the link D. In a design where the axle is located by a single torque tube or stay, the latter may be used in place of the two links C.

It will be observed from Figure 2 that both the tension links D for the front axle 21 are connected to the ends of a transverse, laminated leaf spring 27 adapted to operate in a substantially horizontal plane. The leaf spring 27 is pivotally connected at 28 for rocking movement about a vertical axis to a bracket 29 mounted upon a bar 30 which is suspended at its ends from the chassis-frame by links 31, so that it can swing about a transverse horizontal axis. The bracket 29 is also pivotally connected to the anchorage 32 for a corresponding transverse, laminated leaf spring 33 to the ends of which the tension links D for the rear suspensions are connected.

As will be well understood, the springs 27, 33 may be adjusted to the desired stressed position by packing the anchorages with appropriate plates 34 for each of the transverse springs.

As will be seen from a study of Figure 3, when the wheel rises relatively to the chassis-frame from a position in which it was freely suspended to a normal load position, the wheel movement is materially greater than the spring movement. When, however, the wheel rises from the normal load position an equivalent distance to the extreme loaded position the corresponding spring movement is very materially increased and may be greater than the wheel movement. By this means the spring has a large purchase on the wheel, or, conversely, on the load, in conditions of maximum wheel movement, whilst when lightly loaded the wheel has a large purchase on the spring. The change from the one to the other position is gradual and progressive, as a result of which the suspension gives great comfort in different load conditions. In a similar manner the spring return is progressively checked.

The modification of Figure 5 differs from that of Figure 3 mainly in that the point of connection 25 for the arm C to the chassis 29 is at a materially lower level than the connection of the link D to the spring 27, so that the tension link D and the arm C are arranged to be more nearly parallel to one another.

In the modification of Figure 4 the arm C is represented as being in the form of a fore-and-aft laminated leaf spring (which may have a positive camber when the chassis-frame is lifted relatively to the road wheels), serving as a torque stay. The tension is applied thereto through an auxiliary rigid member, such as the auxiliary shackle 37, connected at its upper end to the shackle A and at its lower end to a tension-applying means 38 which can be similar to the spring 27 of Figure 1, whilst intermediate its ends the shackle 37 is connected to the chassis-frame by means of a link 39.

It will be understood that, if preferred, tension could be applied to the link 39, the lower end of the link 37 then being connected to the chassis-frame by means of the tension-applying means indicated by the arrow 38. Alternatively, use may be made of a bellows device (and this term is used herein to include any appropriate form of pressure-responsive device, for example, a diaphragm chamber or piston and cylinder, to which fluid under pressure is supplied). Thus, in Figure 8, one end of the bellows device 42 is fixed to the chassis-frame, the adjacent end of the torque stay C being anchored thereto at 43, and the other end is connected at 44 to the forked end 45 of the tension link D, the pivot 44 being, in this case, connected by an arm 46 pivoted at 47 upon the chassis-frame. 48 represents a pipe for supplying fluid under pressure, from a fluid pressure reservoir 87, to the bellows device to place the suspension in tension.

Preferably, the pipes 48 of the bellows devices of all the suspensions are connected to a common reservoir. In initially adjusting the suspension the air or other fluid pressure in the reservoir should be increased until roll is substantially eliminated, and it should then be reduced a little.

Referring once more to the construction of Figures 1 and 2, it is obvious that the tension of the two transverse springs 27, 33 may be adjusted in other ways than by means of plates 34. Figure 6 shows one such alternative in which a transverse spring 51, by which the links D of the suspensions on opposite sides of a vehicle are tensioned, carries bellcranks 52 fulcrumed upon its ends and hinged to the links D and also hinged to one another by means of an adjustable tension rod 53. This will allow of varying the tension on the spring 51 in a very simple manner, whilst the two associated suspension units are still inter-coupled.

An alternative method of adjusting one of these springs when independent of the other is shown by Figure 7, in which the anchorage 55 for the spring 56 (the ends of which are connected to the tension links D for the opposite suspensions of a motor-vehicle) is hinged at 57 to a bellcrank 58 fulcrumed at 59 upon the chassis-frame and connected at 60 to the chassis-frame by means of an adjustable link 61.

In the constructions described above the suspension has been applied to a through axle. Obviously, however, the principles involved may be applied to an independent suspension.

Figure 9 is a diagrammatic representation of one such arrangement, in which the upper end of the shackle A is connected to the tension link D, the mid-point of the shackle being connected by the arm B to the chassis-frame. In this case the lower end of the shackle is connected with a bracket 64 which is fast with an arm 65 universally mounted or resiliently bushed at 66 upon the chassis-frame and connected at its other end to the bracket 67 upon which the wheel hub assembly is swivelled for steering. The arm 65 is rigidly connected near the bracket 67 with the arm C hinged to the chassis-frame at 25. Thus, the arms C and 65 constitute, in effect, a lower wishbone. An upper wishbone, indicated at 68, inter-connects the chassis-frame and the upper end of the bracket 67.

In the modification shown by Figure 10 the upper end of the shackle A is connected to the tension link D, the lower end to the parallel link or arm C (compare Figure 5), and the mid-point to the oppositely-extending arm B, the tension in this case being applied to the link by means of a bellows device 42 arranged as described above in connection with Figure 8. The bracket 67 upon which the wheel hub assembly is swivelled for steering is connected to the chassis-frame by an upper wishbone 69 and a lower wishbone 70 connected by a link 71 with the lower end of the shackle A.

In the construction of Figure 11 the landing wheels 73, 74 of an aircraft are supported by vertically-extending, guided forks 75 the upper ends of which are connected by links 76 to the lower ends of the shackles A. As before, the reference numerals A, B, C and D are applied to the parts when normally loaded—i. e., when equilibrium has been restored after the landing shock has been taken. The same reference numerals followed by the suffix 2 denote the position of the parts when the wheels are hanging freely prior to contacting the ground. The same reference numerals followed by the suffix 3 denote the position occupied by the parts during the landing shock, when the suspension is strained to its utmost.

The arms B are in this case pivoted to the lower end 78 of an arm 79 hinged upon the aircraft frame. The tension is applied by a pneumatic device comprising a pivoted cylinder 80 with a piston 81 therein to which the tension link D is connected, fluid under pressure being introduced to the appropriate end of the cylinder by means of the pipe 82.

It will be observed that the wheel 73 is shown in the free-of-load position, and that when free of load it can move slightly dependently upon the position of the wheel 74. Similarly, when both wheels bear on the ground, a variation of loading on one of them (such, for instance, as when encountering a bump or depression during the taxying of the aircraft) causes a compensating movement to be made by the other wheel, the resistance to movement of which latter is correspondingly modified by the alteration in position of its associated tension device and link.

In the modification illustrated by Figure 12, the pneumatic cylinder 83 is fixed, and the tension link D, instead of being pivoted to the piston rod 84, is connected thereto by a connecting rod 86, the junction point being guided by a pivoted arm 85.

Although the constructions shown in Figures 11 and 12 have been described with reference to the support of aeroplane wheels, it is obvious that they can be used with equal effect for the support of land vehicle wheels; it is also obvious that the other constructions herein described can be used to support aeroplane wheels.

It will be understood that the compensating feature as between the wheels of the construction illustrated by Figure 11, referred to above, is also present in all of the fluid or mechanically coupled constructions.

What I claim as my invention and desire to secure by Letters Patent of the United States is:

1. A suspension means, between a supporting wheel and a vehicle chassis-frame, including a shackle, a pair of arms respectively pivotally connected at one end to said shackle at spaced points, a pivotal connection between the other ends of said arms to said chassis-frame respectively on opposite sides of said shackle, and prestressed resilient means connected between said shackle and said chassis-frame; said arms orientating said shackle to cause it to convey movement from the wheel axle to said prestressed resilient means to provide a progressively increasing resistance to movement as said wheel axle moves from its freely suspended position to its full load position.

2. A suspension means, according to claim 1, characterised by the prestressed resilient means being a laminated leaf spring.

3. A suspension means, respectively between each of a pair of supporting wheels and a vehicle chassis-frame, including a shackle, a pair of arms respectively pivotally connected at one end to said shackle at spaced points, a pivotal connection between the other ends of said arms to said chassis-frame respectively on opposite sides of said shackle, prestressed resilient means connected between said shackle and said chassis-frame, and connecting means between the suspension means for each wheel; said arms orientating their respective shackles to cause them to convey movement from the respective wheel axis to said prestresssed resilient means to provide a progressively increasing resistance to movement as said respective wheel axis moves from its freely suspended position to its full load position, and said connecting means conveying compensating movements from either of said wheel axes to the other and to said prestressed resilient means.

4. A suspension means, according to claim 3, characterised by a single prestressed resilient means co-operating with the shackles associated with both wheels.

5. A pair of suspension means, according to claim 3, respectively for two pairs of wheels, a support member, a hinged connection between said support member and said vehicle chassis-frame, and anchorage means associated with said support member for the said prestressed resilient means respectively associated with each pair of wheels; said support member serving to convey compensating movements from either of said pairs of wheels to the other and to said respective prestressed resilient means in addition to providing the said connection between the respective prestressed resilient means and said vehicle chassis-frame.

RAYMOND GREAVES.

REFERENCES CITED

The following references are of record in the file of this patent:

UNITED STATES PATENTS

| Number | Name | Date |
| --- | --- | --- |
| 1,449,524 | McHugh et al. | Mar. 27, 1923 |
| 1,462,731 | Antonelli | July 24, 1923 |

FOREIGN PATENTS

| Number | Country | Date |
| --- | --- | --- |
| 195,776 | Great Britain | Apr. 10, 1923 |